Jan. 10, 1939.  H. P. TOLER  2,143,335
BLOWER
Filed April 14, 1936
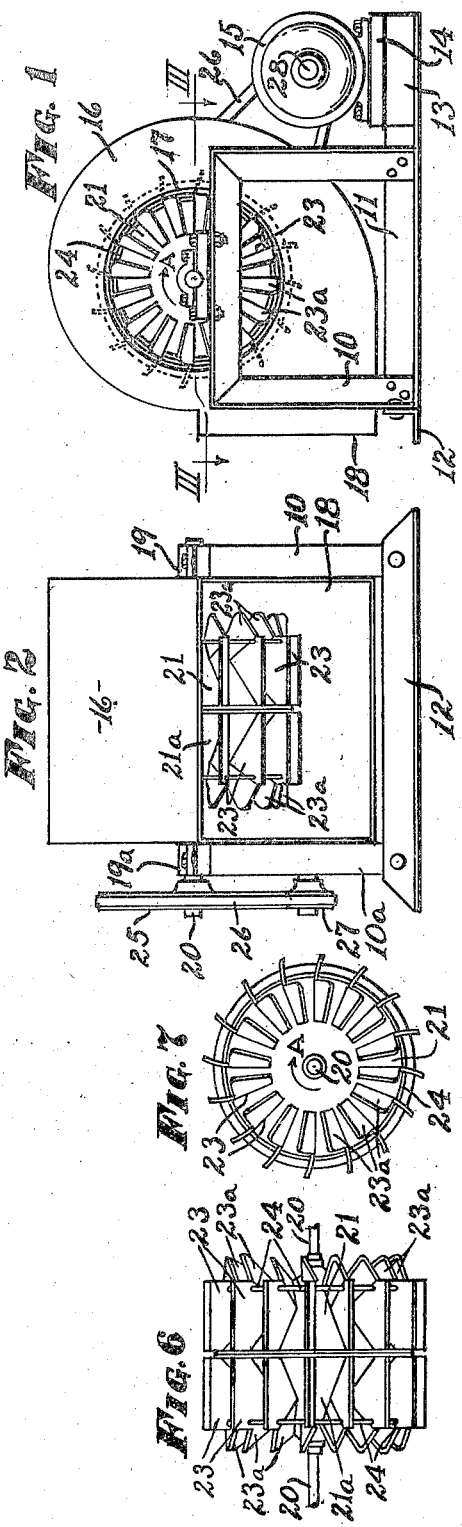
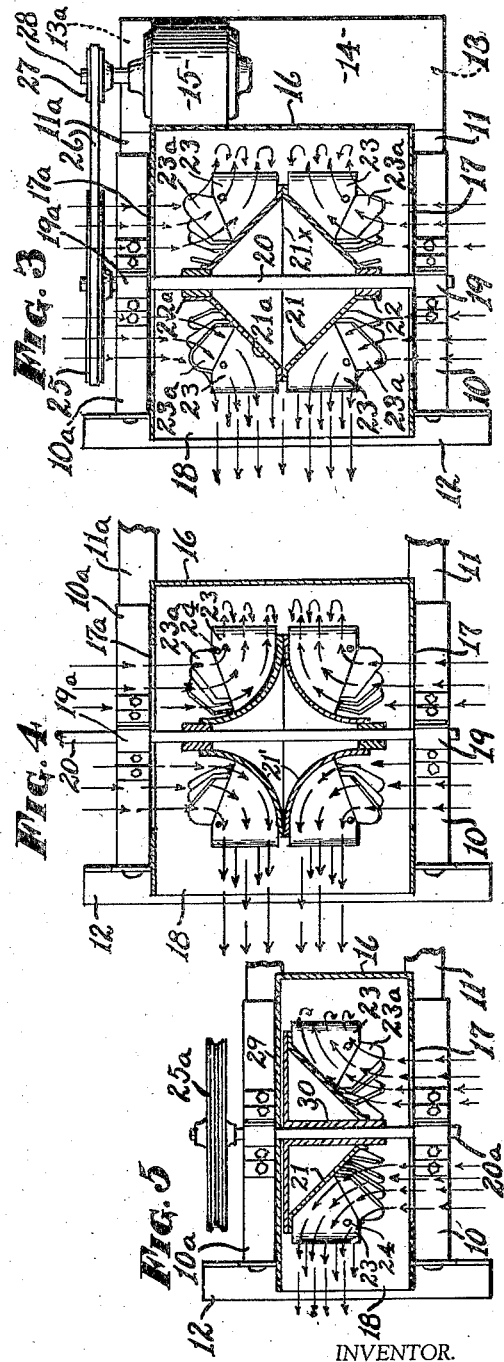
INVENTOR.
Homer P. Toler
BY
M. Y. Charles
ATTORNEY.

Patented Jan. 10, 1939

2,143,335

UNITED STATES PATENT OFFICE 2,143,335

BLOWER

Homer P. Toler, Wichita, Kans.

Application April 14, 1936, Serial No. 74,251

1 Claim. (Cl. 230—128)

My invention relates to an improvement in blowers, such as is used in ventilating systems as well as in heating or cooling systems.

The object of my invention is to provide a blower of the kind mentioned, in which the resistance of the air travel through the blower is materially decreased, due to the construction of the rotor and its relative size in relation to the blower housing, and due to this construction the blower may be operated with less driving power than has heretofore been possible, thereby decreasing the expense of operation.

A still further object of the invention is to provide a blower of the kind mentioned, in which the air intake openings are spacious and somewhat unobstructed, due to the construction of the rotor which provides a condition whereby natural drafts may pass through the blower with comparative ease when the blower is not running.

It has also been found that a blower, having my improved rotor therein, will deliver increased flow of air at slower rotor speed than is usual, therefore the blower will operate more quietly, which is a highly desirable feature.

The foregoing mentioned improvements in operation and performance is due to the improved design and construction of the rotor and associated parts, which will be apparent in the following description.

Referring to the accompanying drawing, Fig. 1 is a side view of my improved blower. Fig. 2 is a front view of Fig. 1. Fig. 3 is a sectional view of the blower, taken along the line III—III in Fig. 1, and looking in the direction of the arrows. Fig. 4 is also a sectional view, taken along the line III—III in Fig. 1, but showing a modified form of the rotor. Fig. 5 is a sectional view taken along the line similar to III—III in Fig. 1, but showing a device in which the air intake is only on one side of the blower housing. Fig. 6 is a face view of my improved rotor. Fig. 7 is an end view of my improved rotor.

In the drawing, similar numerals of reference designate the same part throughout the several figures.

At 10 and 10a is shown a pair of inverted U-shaped frame elements which are rigidly attached to a pair of parallel base elements 11 and 11a. Said frame elements 10 and 10a being spaced apart and rigidly attached to a cross frame element 12. At the rear of the frame elements 11 and 11a is placed a pair of blocks 13 and 13a which are rigidly attached to the base frame elements 11 and 11a. At 14 is a cross member, rigidly attached to the blocks 14 and 14a on which is rigidly mounted an electric motor for driving the blower rotor.

Between the frame elements 10 and 10a is positioned the blower housing 16, which is also supported by the elements 10 and 10a. Said housing 16 is provided with a pair of large air intake openings 17 and 17a. At 18 is a large air discharge opening.

On the frame elements 10 and 10a is a pair of bearings 19 and 19a in which is rotably mounted a shaft 20, on which is rigidly mounted the blower rotor, which, as shown in Fig. 3 is comprised of a pair of cone shaped elements 21 and 21a, the bases of which are rigidly joined together along the line 21x and the apex of the cones terminate on bearing elements 22 and 22a, which are rigidly attached to the shaft 20, so that the rotor will be rotarily driven by the turning of the shaft 20.

On the cone elements 21 and 21a are rigidly fixed a plurality of radially extending fins 23. The outer ends of which are curved forward with respect to the direction of rotation of the rotor, however it will be understood that the outer ends of the fins 23 may be made straight, or curved rearwardly, depending on conditions that might arise in which it might be desirable to make the outer ends of the fins 23 straight or curved rearwardly.

The outer edges of the fins 23 slant toward the cone on which the fin is mounted so as to provide a large area through which incoming air may enter between the rotor fins.

On the outer edges of the slant portions of the fins 23 are fin extension elements 23a which are set at an angle to the fins 23, so that the fin extensions 23a extend in a forward direction from the fins 23 with respect to the direction of travel of the rotor.

At 24 is a heavy wire or rod that is circular in shape and is passed through the outer portion of the fins 23 and is rigidly attached to each of the fins 23 as a means of stabilizing the fins and making them rigid and maintaining their equal spacing apart.

Attention is called to the fact that due to the construction of the rotor, the load of the rotor is carried on the bearing blocks 22 and 22a which are positioned in close proximity to the bearings 19 and 19a, therefore the rotor drive shaft 20 may be a much smaller shaft than is found in the conventional type blowers and still the rotor is carried with much more rigidity and less tendency of the drive shaft 20 to whip during the rotation of the rotor.

Rigidly mounted on the shaft 20 is a belt wheel 25, which is driven by a belt 26 that is driven by the belt pulley 27 which is rigidly attached to the motor drive shaft 28.

Referring to Fig. 4, attention is called to the fact that the rotor cones have curved sides as at $21^1$ instead of straight, as shown in Fig. 3, which, it has been found, will turn the incoming air and discharge it through the discharge opening 18 with greater ease than the design shown in Fig. 3, otherwise the designs shown in Figs. 3 and 4 are identical and work with similar results.

In Fig. 5 is shown a design having the features of that shown in Fig. 3, except that the blower is a smaller machine than that shown in Fig. 3 and is provided with only one cone $21^1$ and accompanying fins and fin extensions, as previously described. In this machine the air enters only at one side, instead of both sides as illustrated in Figs. 3 and 4.

In the design shown in Fig. 5, the base of the cone $21^1$ is rigidly attached to a circular plate 29 which is integral with a hub 30 that is rigidly attached to the drive shaft 20a. On the outer end of drive shaft 20a is a drive pulley 25a which is driven the same as described in Fig. 3.

The operation of the blower is as follows: The electric motor 15, through the belt 26, drives the belt pulley 25 and drive shaft 20 to rotate the blower rotor in the direction of the arrow A, whereupon the fin extensions 23a catch the air and pull it in front of the fins 23, the air supply coming through the large air intake openings 17, whereupon the air is driven in a circular direction with the rotor and by centrifugal force is thrown into the outer portions of the blower housing 16 from where it is discharged through the opening 18. It will be noted that as the air comes into the rotor, it will strike the walls of the cone, which are positioned at an angle to the incoming air and for this reason, the air is deflected to change its direction of travel and this is done with a decreased friction because of the position of the walls of the cone, therefore larger amounts of air will travel through the blower and less power is required to drive the blower, hence the object of the invention is accomplished.

In Fig. 4 as previously mentioned, it will be noticed that the walls of the cones are curved instead of straight, therefore the incoming air is drawn in and turned by the curved walls of the cones which offer less resistance to the travel of the air than if the air was striking a straight surface. The device shown in Fig. 5 operates the same as the device shown in Fig. 3, except that the machine is a smaller machine and has only one air intake instead of two and employs a rotor which is the equivalent of one-half of the rotor shown in Fig. 3.

Such modifications may be employed as lie within the scope of the appended claim without departing from the spirit and intention of the invention. Now, having described my invention, what I claim as new and desire to secure by Letters Patent is:

In a blower of the kind described; a frame work, a blower housing in said frame work, air intakes in the walls of said housing, and an air exhaust opening in said housing, a shaft, said shaft being rotatably carried in bearings on said frame work, a rotor on said shaft, said rotor being considerably narrower than the blower housing, said rotor comprising a pair of abutting concave cone elements, the concave portion of said cone elements being a quarter circle so as to gradually deflect a flow of air from a straight line to an angle of ninety degrees, a plurality of fin-like elements on said cone elements and extending radially therefrom, said fin-like elements having laterally extending fin-extension portions that are bent in a forward direction with respect to the direction of rotation of the rotor, the extreme point of said fin-extensions being spaced far enough away from the side walls of the blower housing to permit the free and unobstructed passage of air through said air intake openings past said rotor and through said discharge opening when said rotor is not in motion.

HOMER P. TOLER.